(12) United States Patent
Koshimizu et al.

(10) Patent No.: US 6,473,576 B1
(45) Date of Patent: Oct. 29, 2002

(54) IMAGE FORMING APPARATUS WITH SHEET FEEDING DEVICE HAVING SHEET SUPPORTING PORTION

(75) Inventors: Yoshiyuki Koshimizu, Abiko; Naomasa Kimura, Moriya-machi; Masakazu Mori; Hideki Mori, both of Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,056

(22) Filed: May 10, 2000

(30) Foreign Application Priority Data

May 31, 1999 (JP) .............................. 11-151784
Jan. 18, 2000 (JP) ....................... 2000-009014

(51) Int. Cl.[7] .............................................. G03G 15/00
(52) U.S. Cl. ....................................... 399/107; 399/393
(58) Field of Search .............................. 271/3.01, 3.02, 271/3.03; 399/23, 107, 124, 365, 377, 379, 391, 392, 393

(56) References Cited

U.S. PATENT DOCUMENTS

| | | | |
|---|---|---|---|
| 5,043,770 A | 8/1991 | Nagano et al. | |
| 5,300,999 A | 4/1994 | Koh et al. | |
| 5,307,133 A | 4/1994 | Koshimizu et al. | |
| 5,359,402 A | * 10/1994 | Nakahata et al. | 399/393 |
| 5,391,450 A | 2/1995 | Nagatsuka et al. | 430/99 |
| 5,905,934 A | 5/1999 | Koshimizu | 399/396 |
| 5,907,745 A | * 5/1999 | Azuma et al. | 399/92 |

\* cited by examiner

*Primary Examiner*—Hoang Ngo
(74) *Attorney, Agent, or Firm*—Fitzpatrick, Cella, Harper & Scinto

(57) ABSTRACT

A space-saving image forming apparatus of high usability includes a reader section for reading an image recorded on an original, an image forming section including a process cartridge for forming an image read by the reader section, a sheet loading cassette for accommodating sheets for forming images provided between the reader section and the image forming section, and a feeding section for feeding the sheets accommodated in the sheet loading cassette to the image forming section.

26 Claims, 11 Drawing Sheets

IMAGE FORMING APPARATUS WITH SHEET FEEDING DEVICE HAVING SHEET SUPPORTING PORTION

BACKGROUND OF THE INVENTION

1. Field of the Invention

The present invention relates to an image forming apparatus such as a copying machine, a printer or a facsimile apparatus and to an image forming apparatus having the functions of these apparatuses.

2. Description of the Related Art

Recently, there has been proposed an image forming apparatus such as a copying machine, a printer or a facsimile apparatus, as well as image forming apparatus having the functions of these apparatuses, which uses a so-called flat bed type original tray and a stationary optical system as the reading means.

Regarding such an image forming apparatus, there have been proposed various types of sheet conveying paths for conveying a sheet to the image forming section and for discharging it to the exterior of the apparatus. For example, FIG. 10 is a side sectional view which shows an image forming apparatus 100 serving as a copying machine.

The image forming apparatus comprises an image forming section including a reader section 102 provided above a casing 101 and adapted to optically scan an original image and read it to generate image information, a laser scanner unit 103 provided below the reader section 102 and adapted to reproduce the original image on a sheet P in accordance with the image information of the original generated in the reader section 102, a process cartridge 105, and a fuser 106. A sheet supporting section 114 is arranged on the rear side of the apparatus main body (the right hand side in FIG. 10) and is adapted to support a plurality of sheets P, such as copying paper. The apparatus further comprises a manual sheet supply section 113 for manually supplying sheets P one by one, a sheet feeding mechanism 104 equipped with a feeding roller 104a for feeding the sheets P supplied from the sheet supporting section 114 or the manual sheet supply section 113 to the process cartridge 105, and sheet conveying means consisting of various rollers for conveying the sheets P.

In the image forming apparatus 100, the sheets P supplied from the sheet supporting section 114 or the manual sheet supply section 113 are separated and fed one by one by the sheet feeding mechanism 104 at the bottom, and supplied to the process cartridge 105, where a toner image formed by the process cartridge 105 is transferred to the sheet.

After this, the image is supplied to the fuser 106, where the toner image is fixed to complete the image forming process, and then the sheet with the image is discharged to the exterior of the apparatus by the pair of rollers of the sheet discharge section 115.

This image forming apparatus 100, in which the sheet conveying path is short, provides various advantages. For example, the time for copying the first sheet can be shortened, jamming does not easily occur, a reduction in the size of the apparatus is possible, and the apparatus is inexpensive.

In the image forming apparatus 100 shown in FIG. 10, the sheet supporting section 114 supports the sheets P in an inclined position, and holds substantially the central portion of the sheets, so that it is difficult to supply a large number of sheets. Further, dirt is liable to adhere to the sheets P, and dust is liable to accumulated thereon.

In addition, in the image forming apparatus 100, all of the means for supplying the sheets P, namely the sheet supporting section 114 and the manual sheet supply section 113, are provided on the rear side of the apparatus, so that depending upon the apparatus installation condition, the supplying of the sheets P may be difficult.

Thus, it is required of this image forming apparatus 100 to make it possible to supply a large quantity of sheets, to provide additional sheet supplying means on the front side of the apparatus, etc. More specifically, it might be possible, for example, to add to the front side of the apparatus a cassette feeding mechanism using a sheet loading cassette capable of supplying a large quantity of sheets.

FIG. 11 shows an example in which, while maintaining the basic construction of the image forming apparatus of FIG. 10, a sheet loading cassette (hereinafter simply referred to as a sheet cassette) 107 is attached to the bottom front portion of the apparatus main body, and a sheet feeding mechanism is provided from the sheet cassette 107. The components which are the same as those shown in FIG. 10 are indicated by the same reference numerals.

In this image forming apparatus 200 shown in FIG. 11, there is a sheet feeding path 108 from the downstream side of the cassette 107 to the image forming section, and the sheets fed from the downstream side of the sheet cassette 107 are caused to make a U turn at the sheet feeding path 108 and conveyed to the process cartridge 105.

The sheet cassette 107 is capable of loading and accommodating a large number of sheets, and is attached to casing 101A such that the loaded sheets are substantially horizontal. Further, the sheet cassette 107 is equipped with a cover 107a for preventing dust and other contaminants from adhering to the loaded sheets.

Due to this arrangement, in the image forming apparatus 200, sheet feeding by way of two sheet feeding paths in two directions is realized. Further, the arrangement provides the following advantages: the time for copying the first sheet can be shortened, jamming does not easily occur, etc. At the same time, it is possible to supply a large number of sheets to the sheet cassette 107 and to prevent dirt, dust and other contaminants from adhering to the sheets loaded in the sheet cassette 107.

However, in the image forming apparatus 200 shown in FIG. 11, it is necessary to join the sheet feeding paths from the two directions. Further, it is necessary to add a pair of rollers 109 in order to prevent a deterioration in conveying power due to the rounding of the sheet feeding path 108 from the sheet cassette 107. Thus, as is apparent from comparison with FIG. 10, the length of the sheet feeding path from the sheet feeding mechanism 104 to the process cartridge 105 increases.

As a result, in the image forming apparatus 200, the depth of the casing 101A increases, the size of the entire apparatus increases, and the installation area increases. Further, since the sheet feeding path 108 from the cassette 107 is situated considerably deep in the apparatus, jam processing for removing a jammed sheet when it occurs is not easy to perform.

To cope with the above problem, a construction has been proposed in which a door is provided on the right or left-hand side of the casing 101A and in which this door is opened to take in or out the process cartridge 105. However, this involves an increase in the area occupied by the apparatus in use, so that it is actually necessary to secure a wide space for the installation of the apparatus, which is not desirable.

SUMMARY OF THE INVENTION

The present invention has been made in view of the above problems. It is accordingly an object of the present invention to provide an image forming apparatus which is equipped with a sheet supporting means with satisfactory operability and which can be reduced in size while shortening the time for forming the first image, reducing jam generation and achieving a reduction in cost. More specifically, there is provided, in accordance with the present invention, image forming apparatus comprising an image reading means for reading an image on an original, image forming means for forming an image from image information read by said image reading means, and a sheet feeding means for feeding sheets to said image forming means, said sheet feeding means comprising a sheet supporting portion for supporting sheets on which images are to be formed and a feeding portion for feeding the sheets supported in the sheet supporting portion to the image forming means and arranged between the image reading means and the image forming means.

Further objects, features and advantages of the present invention will become apparent from the following description of the preferred embodiments with reference to the attached drawings.

DESCRIPTION OF THE PREFERRED EMBODIMENTS

Embodiments of the present invention will now be described in detail with reference to the drawings.

Figure 1:
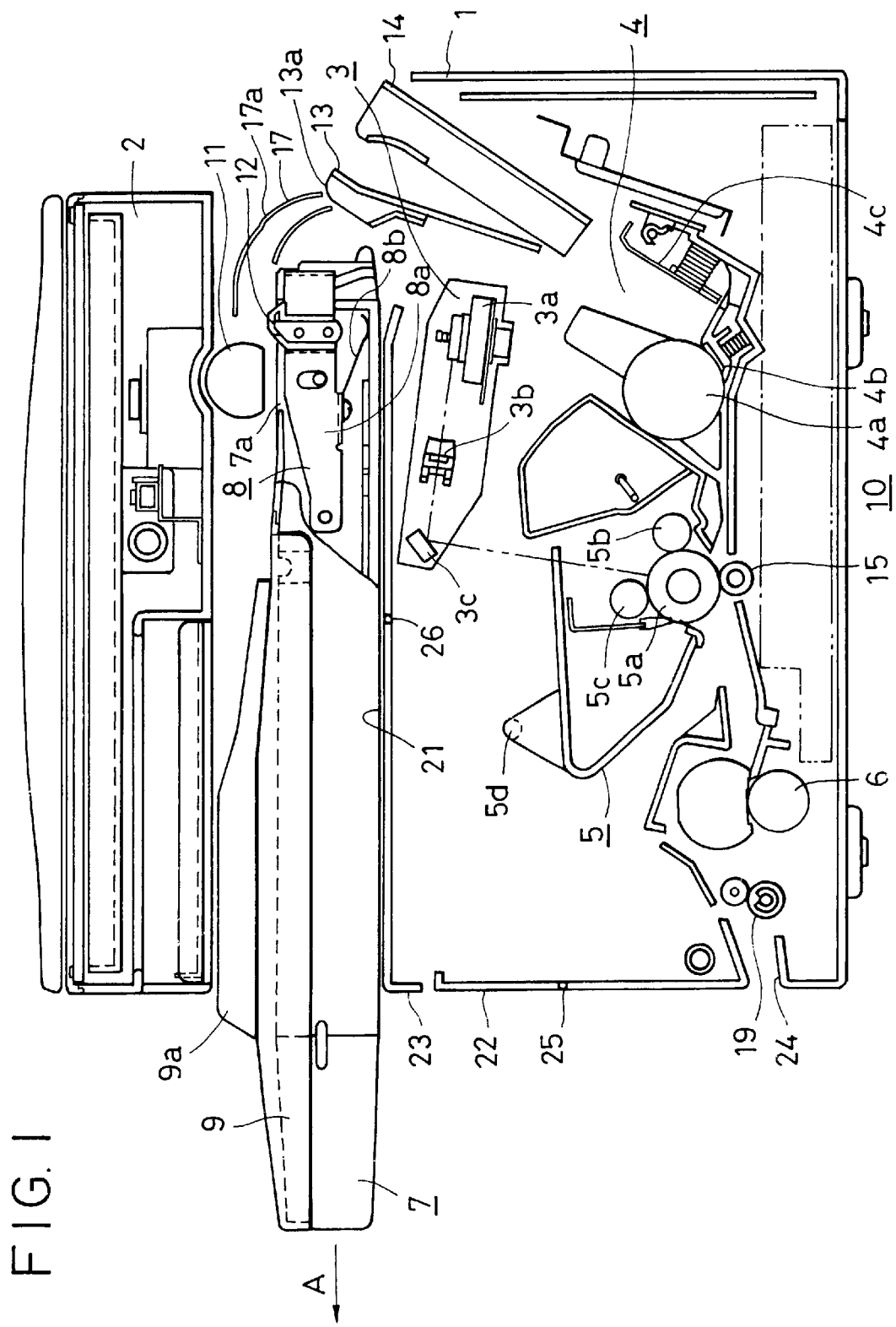
FIG. 1 is a side sectional view showing an image forming apparatus according to a first embodiment of the present invention.

First, an image forming apparatus according to an embodiment of the present invention will be described with reference to FIGS. 1 through 4. FIG. 1 is a partially cutaway sectional view of an embodiment of the present invention. An image forming apparatus 10 according to an embodiment of the present invention comprises a reader section 2 provided in the upper section of a main body casing 1 and serving as an image reading means, a laser scanner unit 3 provided below the reader section 2 and serving as an image forming means for forming an original image on a sheet in accordance with image information generated in the reader section 2, a process cartridge 5, a fuser 6, a sheet loading cassette 7 (hereinafter simply referred to as the cassette 7) arranged between the image forming means and the reader section 2 and serving as a sheet supporting means for loading and supporting a plurality of sheets, and sheet feeding means consisting of various rollers for feeding the sheets supported in the cassette 7 to the image forming means side.

Here, the expression "between" the image forming means where the cassette 7 is arranged and the reader section 2 is not restricted to directly below the reader section 2 or directly above the image forming means. A portion outside these ranges is also encompassed by the expression.

The sheet feeding means of the image forming apparatus 10 includes, from the upstream side, a feeding roller 11 positioned directly below the reader section 2 and on the upper end side of the cassette 7 and serving as a sheet feeding portion, a turn guide 17 downwardly curved from the vicinity of the upper end of the cassette 7 and serving to guide the sheets fed from the cassette 7, a manual feed guide section 13 serving as a guide through which the sheets conveyed by way of the turn guide 17 pass as a guide in which sheets are manually fed one by one from outside, a sheet inclining support section 14 for supporting a plurality of sheets in an inclined position, a feeding means 4 (hereinafter referred to as the multi-feeding section) equipped with a feeding roller 4a for feeding the sheets fed from the various feeding paths to the image forming means, a photosensitive drum 5a in the process cartridge 5, a transfer means 15 positioned below the photosensitive drum 5a, a fixing roller of the fuser 6, and a pair of discharge rollers 19 of the sheet discharge section for discharging the sheets to the exterior.

As shown in FIGS. 1 through 4, there is formed in the main body casing 1 a cassette placing surface 21 on which the cassette 7 is to be placed, a front door 22 and an upper door 23 for attaching and detaching the process cartridge 5, and a discharge opening 24 for discharging the sheets. The front door 22 and the upper door 23 are outwardly rotatable by means of hinge portions 25 and 26, respectively.

Further, the main body casing 1 is provided with a link mechanism (not shown), by means of which the front door 22 is opened simultaneously with the upper door 23.

In this image forming apparatus 10, the reader section 2 serving as the image reading means for reading image information of the original by optically scanning the original is arranged in the uppermost section of the apparatus main body. The reader section 2 has an original tray glass (not shown), an original illuminating lamp (not shown), a mirror (not shown), an image forming lens (not shown), a CCD (not shown), etc. These members constitute a flat bed type original tray and stationary optical system.

In the image forming apparatus 10, when an original is placed on the original tray glass of the reader section 2 and a copying button (not shown) is depressed, the original is illuminated by the original illuminating lamp, and the reflected light is guided by the optical system and forms an image on the CCD through the image forming lens. The CCD converts the image reflection light to an electric signal to thereby generate image information of the original image.

The laser scanner unit 3 comprises a semiconductor laser (not shown) for applying a laser beam based on the original image information generated in the reader section 2 or based on image information input from the outside, and an optical system. The optical system consists of a polygon mirror 3a, an image forming lens 3b, a reflecting mirror 3c, etc. for scan-rotating the laser beam from the semiconductor laser and supplying it to the process cartridge 5. The multi-feeding section 4 comprises a multi-feeding roller 4a for conveying the sheets to the process cartridge 5, a separation pad 4b for separating the sheets one by one, a middle plate 4c for supplying the forward end of the sheet supported by the sheet supporting portion 14 or the sheet supplied through the manual feed guide portion 13, a coil spring (not shown) for biasing the separation pad 4b and serving as a biasing means and the middle plate 4c toward the feeding roller 4a, etc.

The process cartridge 5 serves to create a visual image on a sheet conveyed from the multi-feeding section 4 on the basis of image information, and integrally comprises a photosensitive drum 5a which is irradiated with the laser beam from the laser scanner unit 3 to form a electrostatic latent image by an electrophotographic system, a developing means equipped with a developing sleeve 5b for developing the electrostatic latent image formed on the photosensitive drum 5a, a primary charging means 5c for charging the photosensitive drum 5a, and a cleaning means (not shown) for removing the toner remaining on the surface of the photosensitive drum.

This process cartridge 5 is arranged below the laser scanner unit 3 and is detachable from the apparatus main body. Regarding the attachment and detachment, a detailed description will be given below.

The fuser 6 conveys the sheet to the sheet discharge section 19 as it fixes the image transferred to the sheet by heat and pressure. The sheet conveyed from the fuser 6 is discharged to the exterior of the apparatus through the discharge opening 24 of the casing 1 by means of the pair of discharge rollers 19 of the sheet discharge section.

In the image forming apparatus 10, the cassette 7 serving as the sheet supporting portion for supporting a plurality of sheets is detachably arranged on the upper surface of the casing 1 directly below the reader section 2. This cassette 7 is formed substantially as a rectangular parallelepiped, and can support, for example, approximately 250 A4 size copying sheets. The cassette 7 contains the biasing means 8 for upwardly biasing the supported sheets, and a separation claw 12 for separating the sheets one by one at the time of feeding.

Further, on the base end side of the cassette 7, there is formed an upper end opening 7a for exposing the forward end (leading edge) of the sheets and serving as a sheet opening portion.

The biasing means 8 of the cassette 7 comprises a guide member 8a for guiding the leading edge of the sheet to the upper end opening 7a and a spring 8b for upwardly biasing the guide member 8a.

The cassette 7 has in its upper section a cover 9 for preventing dirt, dust and other contaminants from entering the interior of the cassette. In order that the sheet condition in the cassette 7 may be seen, this cover 9 is formed of a material which is transparent or translucent.

Figure 2:
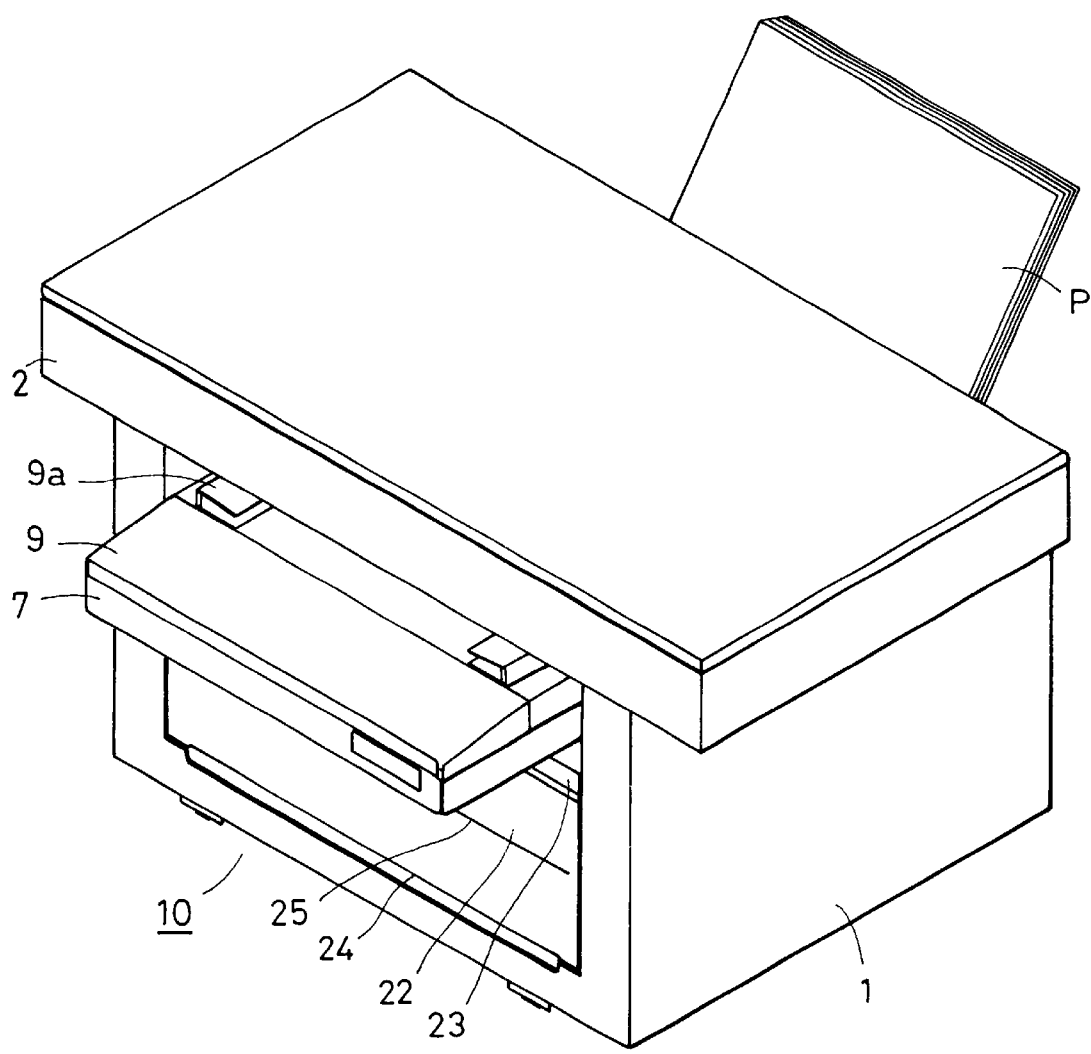
FIG. 2 is an outward perspective view of the image forming apparatus of the first embodiment.
Figure 3:
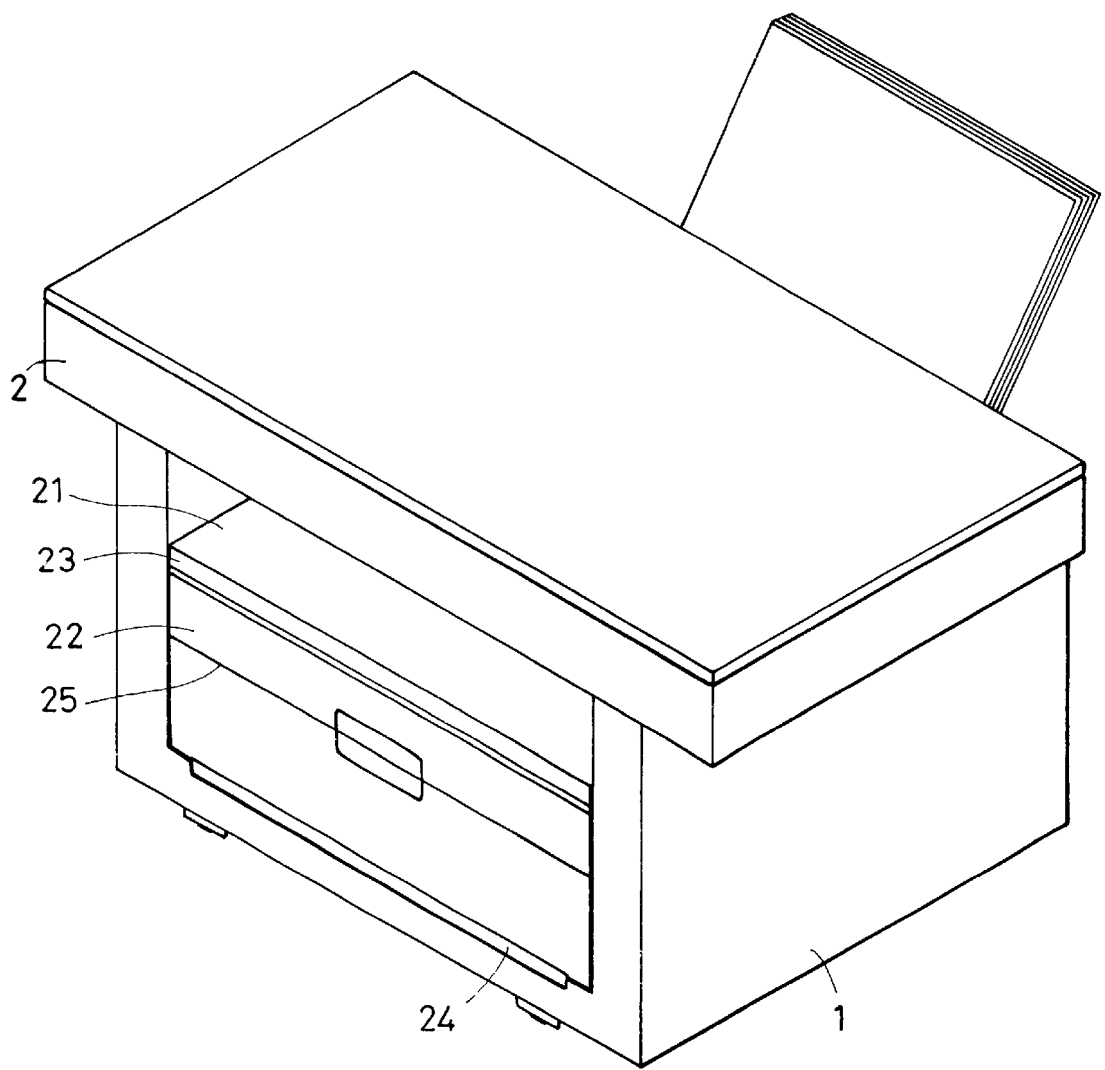
FIG. 3 is an outward perspective view of the image forming apparatus with the sheet cassette removed.

Further, as shown in FIGS. 1 and 2, there is provided on the upper surface of the cover 9 a manual feed guide section 9a for manually supplying a sheet to the feeding roller 11. That is, in the image forming apparatus 10, the space generated between the upper portion of the cassette 7 and the reader section 2 through the arrangement of the feeding roller 11 is utilized to provide on the upper surface of the cover 9 the manual feed guide section 9a for guiding the sheets to the feeding roller 11, whereby the number of feeding routes for the sheets increase, thereby making it more convenient for the user.

The cassette 7 can be detached from the casing 1 by drawing it in the direction of the arrow A of FIG. 1 (to the front side of the apparatus main body). FIG. 2 is an outward perspective view of the image forming apparatus 10, with the cassette 7 attached thereto. In this condition, a part of the cassette 7 protrudes forwardly from the apparatus main body. In the condition shown in FIG. 3, the cassette 7 is removed.

As shown in FIG. 1, in the image forming apparatus 10, the feeding roller 11 serves as the sheet feeding portion for feeding the sheet supported in the cassette 7 or supplied by manual feeding through the manual feed guide section 9a feeding roller 11 is rotatably arranged above the opening 7a of the cassette 7 attached and directly below the reader section 2.

Figure 4:
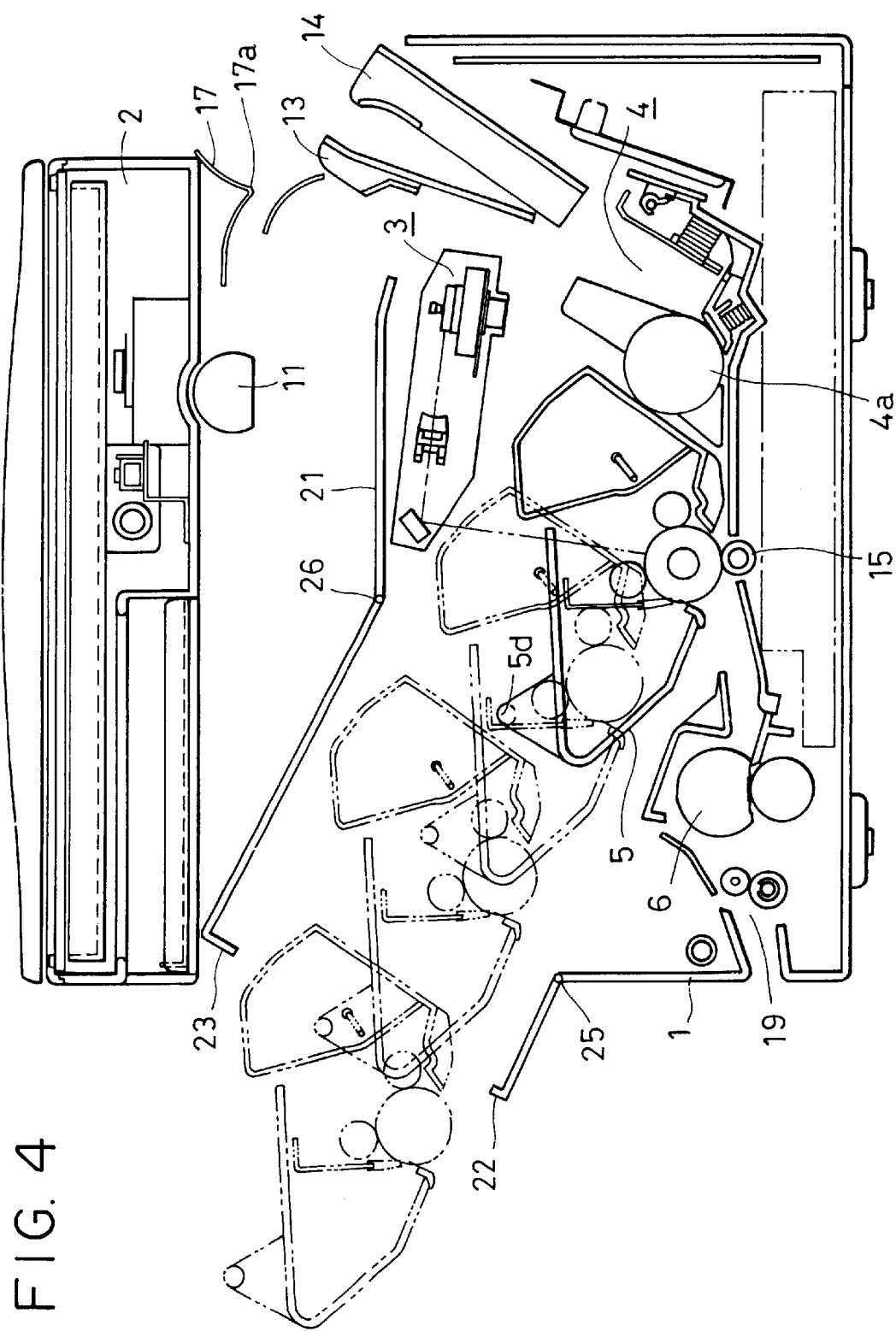
FIG. 4 is a side sectional view of the image forming apparatus with the sheet cassette removed, illustrating process cartridge replacement and jam processing.

And, in this image forming apparatus 10, the turn guide 17 is downwardly curved from the upper end side of the cassette 7 and is in the vicinity of the feeding roller 11. A hinge portion 17a is formed on the outer guide of turn guide 17. As shown in FIG. 4, to facilitate jam processing when a sheet jam occurs, the downstream side of this outer guide with respect to the sheet feeding direction is upwardly rotatable around the hinge portion 17a.

On the downstream side (the sheet outlet side) with respect to the sheet feeding direction of the turn guide 17, there is positioned the inlet of the manual feed guide section 13. At the position where the sheet outlet of the turn guide 17 and the sheet inlet side of the manual feed guide section 13 join each other, there is formed a sheet manual feed supply opening 13a for supplying the sheet manually to the multi-feeding section 4. The sheet guide surface of the manual feed guide section 13 is arranged so as to guide the sheet in the direction of the multi-feeding section 4.

On the outer side of the manual feed guide section 13, there is arranged the sheet inclining support section 14 capable of supporting a plurality of sheets. The bottom of this sheet inclining support section 14 is substantially parallel with the middle plate 4c of the multi-feeding section 4, whereby when the sheet is inserted into the sheet inclining support section 14, the forward end portion of the sheet is positioned on the middle plate 4c of the multi-feeding section 4, and the sheet is supported by the sheet inclining support section 14 such that it leans against the rear side of the apparatus main body. In the state shown in FIG. 2, the sheet P is inserted into the sheet inclining support section 14.

In this way, a conveying route for feeding the sheet is provided in four places: the interior of the cassette 7, the manual feed guide section 9a on the upper surface of the cassette 7, the manual feed guide section 13 provided above and in the vicinity of the multi-feeding section 4, and the sheet inclining support section 14. And, in this image forming apparatus 10, it is possible to switch, by an operating section (not shown), between the feeding from the cassette 7 and the feeding from the multi-feeding section 4.

When feeding from the cassette 7, the feeding roller 11 rotates and abuts the sheet, whereby the uppermost sheet supported in the cassette 7 is separated by the separation claw 12 of the cassette 7 and fed out.

When a single sheet is manually fed from the manual feed guide section 9a, this sheet is fed by the feeding roller 11 and the separation claw 12. That is, when a sheet is inserted into the manual feed guide section 9a on the cover 9 of the cassette 7, the sheet is positioned above the uppermost sheet supported inside the cassette 7. And, when feeding from the cassette 7 is selected, the sheet inserted into the guide section 9a is fed by the rotation of the feeding roller 11.

The sheet fed by the feeding roller 11 is conveyed as it is guided by the turn guide 17. It then enters the manual feed guide section 13, and is guided through the sheet support section 14 to multi-feeding section 4, where it joins the sheets placed on the middle plate 4c of the multi-feeding section 4.

Feeding roller 4a and the separation pad 4b of the multi-feeding section 4 work together so that the uppermost sheet on the middle plate 4c is separated and conveyed to the process cartridge 5.

In this image forming apparatus 10, when, for example, forming images on both sides of a sheet, when the sheet on one surface of which an image has been formed is discharged from the discharge opening 24, the front and rear sides of the sheet are reversed, and the sheet is inserted into the guide section 9a of the cassette 7. At this time, the sheet is inserted into the guide section 9a with the side on which the image has been formed facing upward, which facilitates the operation for the user.

Further, in the mode in which the image on the second side starts to be formed not from the front but from the rear side, the discharged sheet is inserted as it is into the guide section 9a of the cover 9. As a result, the top and bottom of the images on both sides coincide with each other, and there is no need to reverse the front and rear sides of the sheet, so that it is very easy for the user to perform the operation.

When feeding from the multi-feeding section 4 is selected, the feeding roller 11 does not rotate, the feeding roller 4a rotates, and the middle plate 4c moves to the feeding roller 4a side, whereby the uppermost one of the plurality of sheets stacked on the middle plate 4c abuts the feeding roller 4a, and enters the nip between it and the separation pad 4b. The sheet which has entered is separated by the feeding roller 4a and the separation pad 4b, and the sheet is supplied to the process cartridge 5.

In the feeding from the multi-feeding section 4, when the sheet is inserted beforehand from the sheet manual feed supply opening 13a of the manual feed guide section 13, the sheet is positioned above the sheet supported by the sheet inclining support section 14, and given priority over the sheet supported by the sheet inclining support section 14, and fed by the same mechanism and operation.

When manually supplying a sheet from this manual feed guide section 13, the side of the sheet on which the image is to be formed faces upward, which is easier for the user to see. For example, when forming an image on a sheet on which a format, mark, or pattern has been printed beforehand, it is easy for the user to determine the direction in which the sheet is to be set. Further, in the case of manual feeding, the sheet does not move by way of the turn guide 17, and there is no bent sheet conveying route, so that it is suitable for the conveyance of a thick paper, post card or the like.

When the original image is read by reader section 2 and image information is formed, an image is formed on the photosensitive member by an electrophotographic image forming method.

That is, a laser beam emitted from the semiconductor laser of the laser scanner unit 3 on the basis of the image information of the original image is scan-rotated by the polygon mirror 3a, and, as indicated by the dotted line of FIG. 1, this laser beam is supplied to the process cartridge 5 by way of the image forming lens 3b and the reflection mirror 3c, and exposure and scanning is performed on the photosensitive drum 5a of the process cartridge 5.

In the process cartridge 5, an electrostatic latent image is formed on the photosensitive drum 5a by exposure and scanning, and the electrostatic latent image is developed by the developing means, whereby it is visualized on the photosensitive drum 5a as a toner image.

And, in synchronism with the formation of this toner image, the sheets are conveyed one by one from the multi-feed section 4 to the process cartridge 5, and the toner image formed on the photosensitive drum 5a of the process cartridge 5 is transferred to the sheet by the transfer means 15, whereby the original image is reproduced on the sheet. The sheet on which the original image has been transferred is conveyed to the fuser 6. Fuser 6 fixes the transferred toner image, thereby completing the entire image formation process. Further, by the pair of discharge rollers 19 of the discharge section, the sheet is discharged to the exterior of the apparatus by the discharge opening 24.

Next, the method of replacing the process cartridge 5 and the jam processing in the image forming apparatus will be described.

FIG. 4 is a side sectional view of the image forming apparatus, with the cassette 7 removed.

When replacing the process cartridge 5, the cassette 7 is first removed from the apparatus main body, and then the front door 22 on the front side of the casing 1 is opened.

When the front door 22 is opened, the upper door 23 is opened simultaneously by a link mechanism (not shown), with the result that the front side of the casing 1 is open.

At this time, as shown in FIG. 4, the upper door 23 moves through the space that has been occupied by the cassette 7 and can be displaced a distance corresponding to the height of the cassette 7.

Thus, a large opening is formed by the front door 22 and the upper door 23, leaving adequate room to allow the process cartridge 5 to pass.

And, the user puts his hand into the opening formed by opening the front door 22 and the upper door 23 and grabs a grip portion 5d of the process cartridge 5 to pull it upward toward himself, whereby the process cartridge 5 is extracted to the exterior of the apparatus, and the process cartridge 5 can be replaced. Further, when there remains a jammed sheet in the vicinity of or on the front or the rear side the process cartridge 5, it is possible to remove the jammed sheet.

As described above, in the image forming apparatus 10, the cassette 7 is arranged between the reader section 2 and the image forming means such as the process cartridge 5, whereby the sheet is fed in the same direction through a common route, making it possible to achieve a reduction in apparatus size and a reduction in the area occupied by the apparatus in operation. Further, due to the arrangement in which the cassette 7 is removed and the process cartridge 5 is extracted by utilizing the space that has been occupied by the cassette 7, it is possible to facilitate the replacement of the process cartridge 5 and jam processing.

Next, a modification of the present invention described above will be described with reference to FIGS. 5 and 6. The components which are the same as those of the above-described embodiment are indicated by the same reference numerals, and a description of such components will be omitted.

Figure 5:
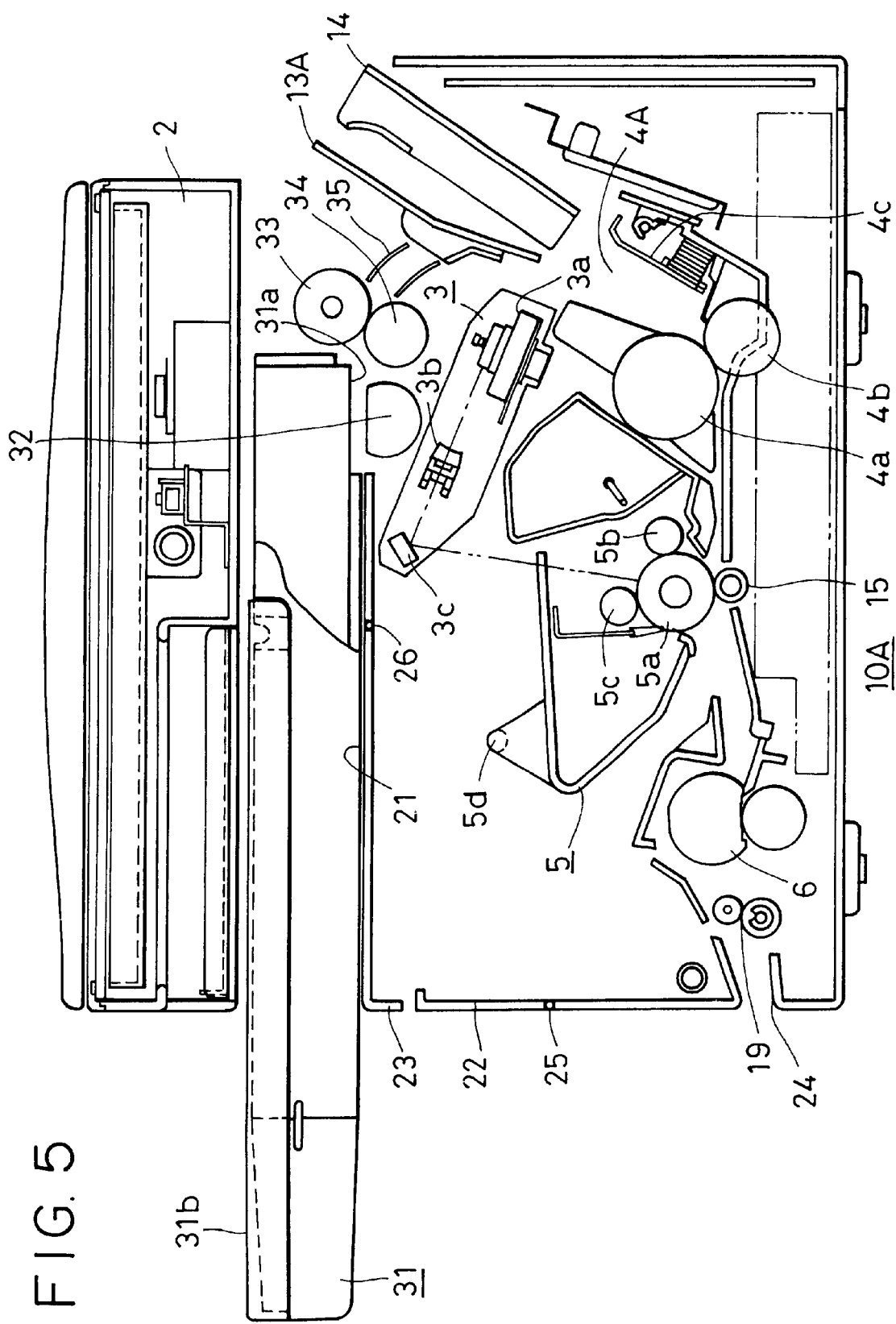
FIG. 5 is a side sectional view showing an image forming apparatus according to another embodiment of the present invention.

As shown in FIG. 5, in the image forming apparatus 10A of this embodiment, the lowermost one of the sheets supported in the cassette 31 serving as the sheet supporting portion is fed.

On the bottom side of the cassette 31, there is formed a lower end opening 31a for exposing the forward end (the leading edge) of the sheet. Below the lower end opening 31a of the cassette 31 attached and in the vicinity of the laser scanner unit 3, there is rotatably arranged a feeding roller 32 serving as the sheet feeding portion for feeding the sheets supported in the cassette 31.

Further, on the downstream side of the feeding roller 32 with respect to the sheet feeding direction, there are arranged a pair of separation rollers 33 and 34, a turn guide 35, and a manual feed guide section 13A, the sheet guide surface of the manual feed guide section 13A being arranged so as to guide the sheet in the direction of the multi-feeding section 4.

As in the first-described embodiment, a transparent or translucent cover 31b is provided on the upper surface of the cassette 31. In this embodiment, no manual feed guide section is provided, thereby allowing for a reduction in the size of the apparatus.

Due to this construction, it is possible to reduce the height of the entire apparatus and reduce the length of the turn guide. In the image forming apparatus 10A, the position of the turn guide is lower than it is in the image forming apparatus 10 of the above-described embodiment.

Figure 6:
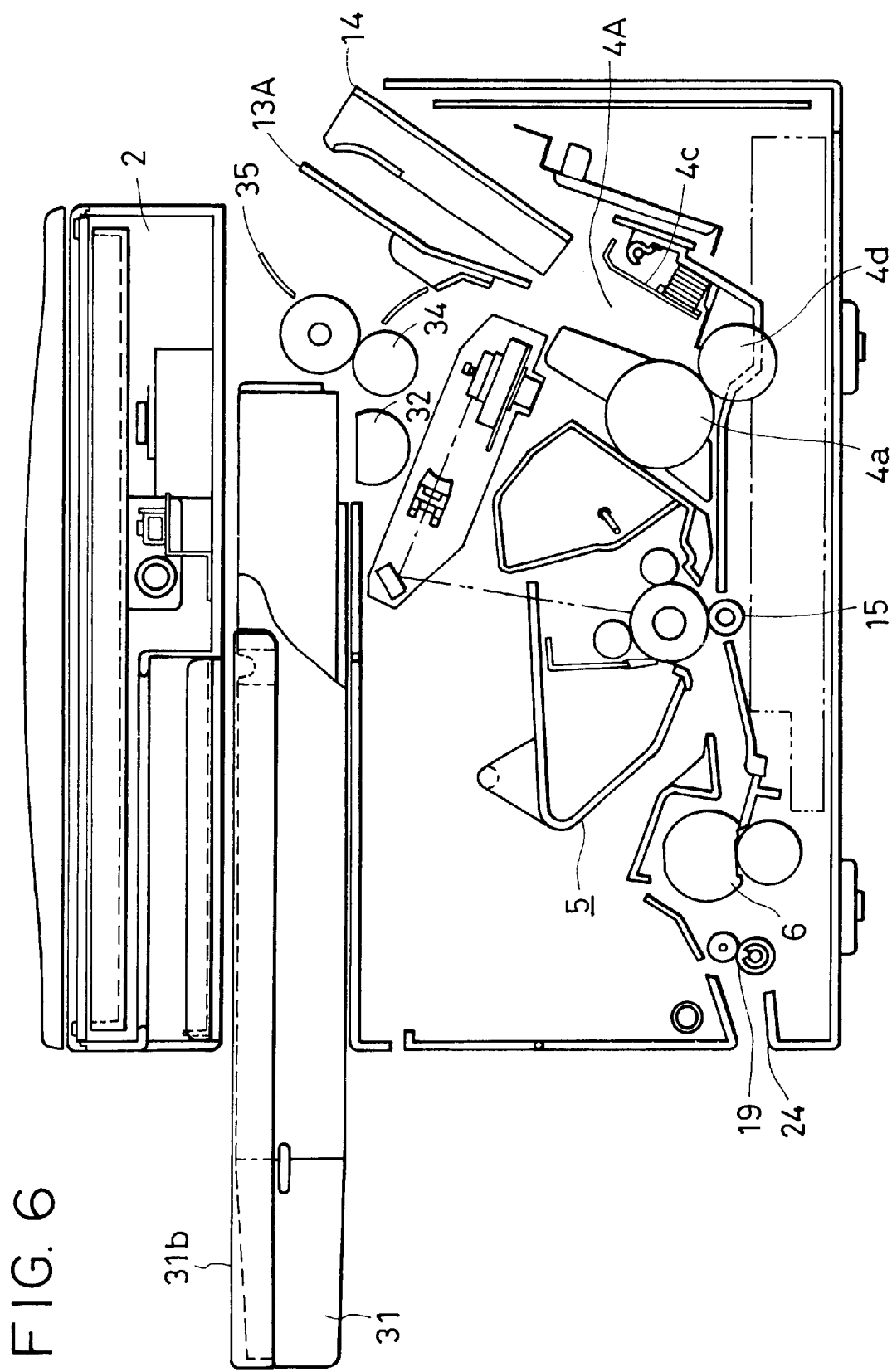
FIG. 6 is a side sectional view of the image forming apparatus shown in FIG. 5, illustrating jam processing.

Thus, the manual feed guide section 13A is constructed such that the outlet of the turn guide 35 joins it on the lower side of the manual feed guide section 13A. Further, as shown in FIG. 6, the turn guide 35 can be opened by moving a guide member outside the apparatus.

Due to this construction, even when a jam occurs in the turn guide 35, it is possible to easily remove the jammed sheet.

A separation roller 4d is used instead of the separation pad 4b as the sheet separation means in the multi-feed section 4A of the image forming apparatus 10A.

The sheet feeding operation in this image forming apparatus 10A will now be described. When, in the image forming apparatus 10A, feeding from the cassette 31 is selected, the feeding roller 32 and the pair of separation rollers 33 and 34 rotate, whereby the lowermost one of a plurality of sheets supported in the cassette 31 is separated and fed out by the feeding roller 32.

The sheet fed by the feeding roller 32 and the pair of separation rollers 33 and 34 advances as it is guided by the turn guide 35, and enters the manual feed guide section 13A, reaching the multi-feeding section 4A. In this way, it joins the sheet placed on the middle plate 4c of the multi-feeding section 4A.

And, the sheet on the multi-feed section 4A is separated by the multi-feed roller 4a and the separation roller 4d of the multi-feed section 4A, and the uppermost sheet is conveyed to the process cartridge 5.

In this image forming apparatus 10A, the sheets stacked and supported in the cassette 31 are fed starting from the lowermost one, whereby the length of the turn guide 35 is reduced, and the radius of curvature of the sheet path increases.

Due to this construction, sheet jams do not easily occur, and it is possible to feed a thick sheet from the cassette 31. Further, there is no need to provide, as in the above-described embodiment, the sheet biasing means 8 for upwardly biasing the sheet, so that the construction of the cassette 31 is simplified, thereby achieving a reduction in cost.

Furthermore, in the image forming apparatus 10A, the separation roller 4d is used as the sheet separation means of the multi-feeding section 4A, so that sheet separation failure does not easily occur. Further, as the sheet is fed, it is reliably guided by the nip portion of the feeding roller 4a and the separation roller 4d, so that, in the case of this modification, in which the sheets are guided to the multi-feeding section 4A from a plurality of different feeding paths, the reliability in feeding is particularly enhanced.

Figure 7:
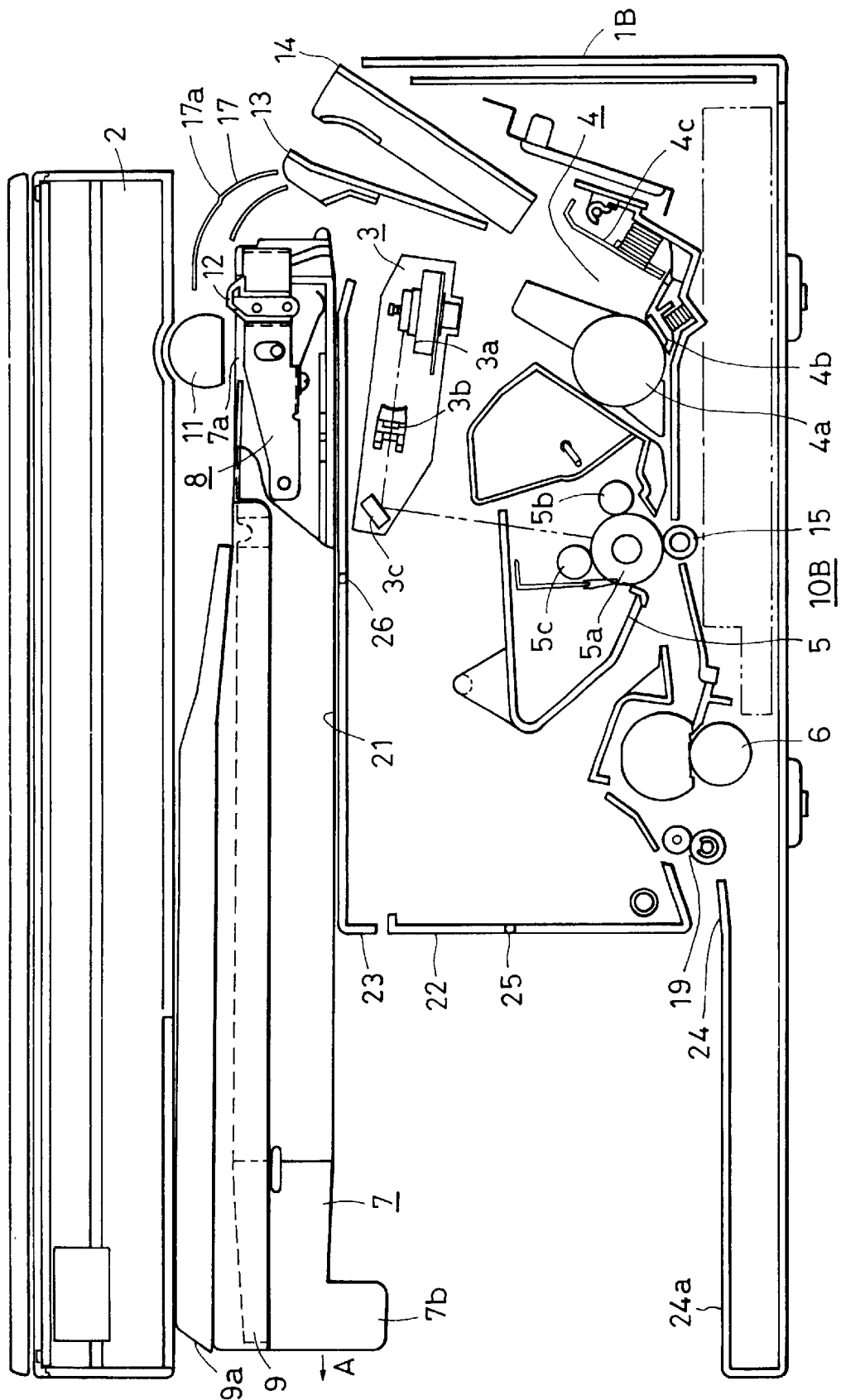
FIG. 7 is a side sectional view showing an image forming apparatus according to another embodiment of the present invention.

Next, another embodiment of the image forming apparatus of the present invention will be described with reference to FIGS. 7 and 8. The components which have the same function as those of the previously described embodiments are indicated by the same reference numerals, and a description of such components will be omitted.

While in the previously described embodiments the present invention is applied to an image forming apparatus of the type in which the original placing direction in the reader section 2 (the original reading direction of the reader section 2) is substantially orthogonal to the direction of the sheets loaded in the sheet loading cassette (the sheet feeding direction), in the image forming apparatus 10B of this modification, the original reading direction of the reader section 2 and the sheet feeding direction are the same.

Further, in the sheet discharge section of the image forming apparatus 10B, the casing 1B extends from below the discharge opening 24 to form a discharge plane portion 24a on which the discharged sheets are stacked.

Furthermore, a grip portion 7b is formed at the forward end of the cassette 7 of the image forming apparatus 10B, and the cassette 7 can be easily detached from the casing 1B by grasping this grip portion 7b and drawing it in the direction of the arrow A.

Figure 8:
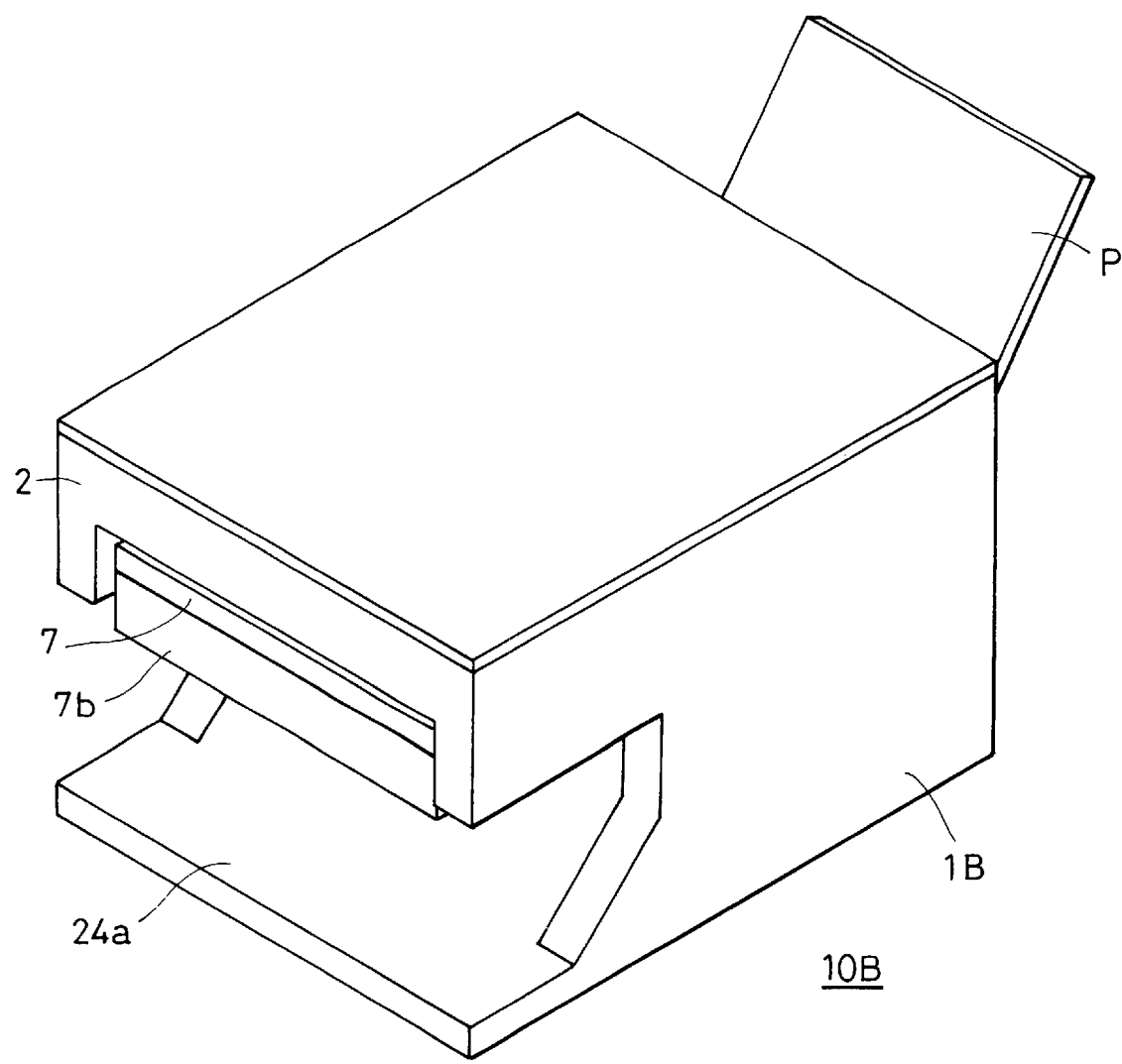
FIG. 8 is an outward perspective view of the image forming apparatus shown in FIG. 7.

As shown in FIG. 8, in this image forming apparatus 10B, constructed as described above, the reader section and the cassette 7 do not protrude, so that the apparatus has a neat box-like outward appearance.

Apart from the above, the construction and the effect of this modification are the same as those of the image forming apparatus 10 of the embodiment of the present invention described with reference to FIGS. 1 through 4, so a description thereof will be omitted.

Next, still another embodiment of the image forming apparatus of the present invention will be described with reference to FIG. 9. The components which have the same configuration and function as those of the above-described embodiments are indicated by the same reference numerals, and a description of such components will be omitted.

In the above-described embodiments, when replacing the process cartridge 5, the cassette 4 is detached from the apparatus main body as shown in FIG. 4, and the front door 22 on the front side of the casing 1 and the upper door 23 are opened to extract the process cartridge 5 through the thereby formed space.

In this embodiment, in contrast, the reading section is rotated in order to enhance the ease with which the process cartridge 5 is extracted and attached, without substantially increasing the area occupied by the apparatus.

Figure 9:
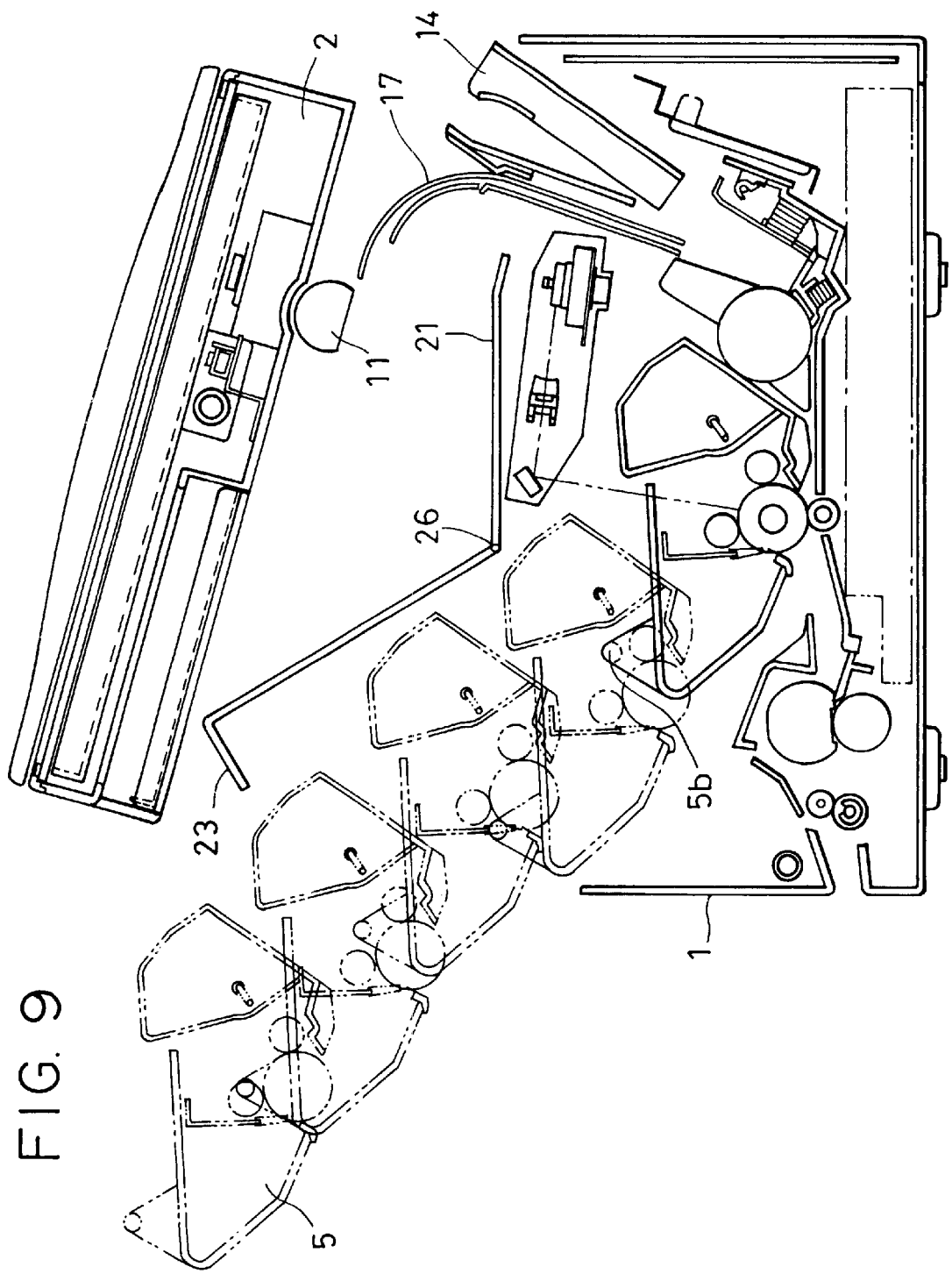
FIG. 9 is a side sectional view showing an image forming apparatus according to another embodiment of the present invention.
Figure 10:
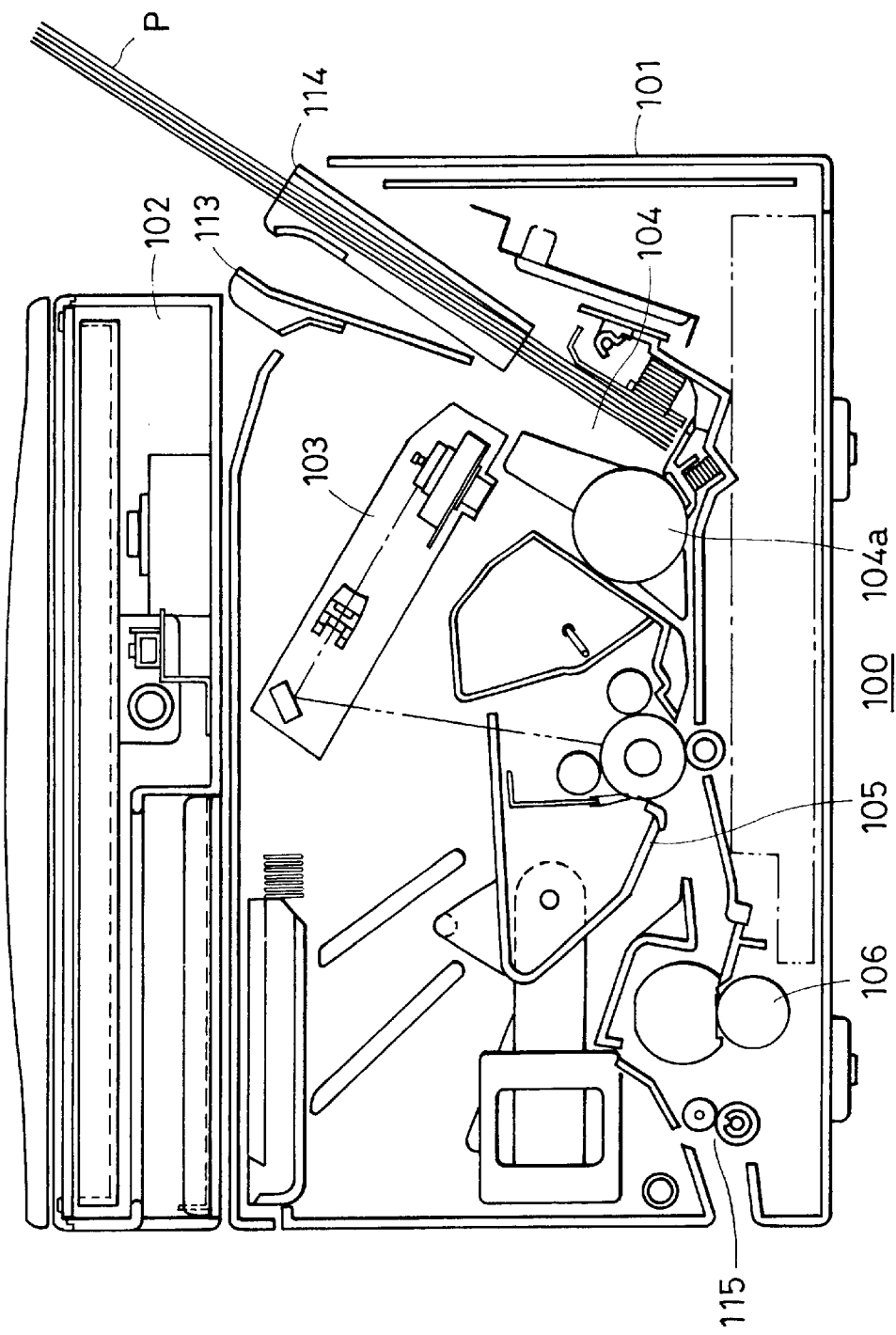
FIG. 10 is a side sectional view of a conventional image forming apparatus.
Figure 11:
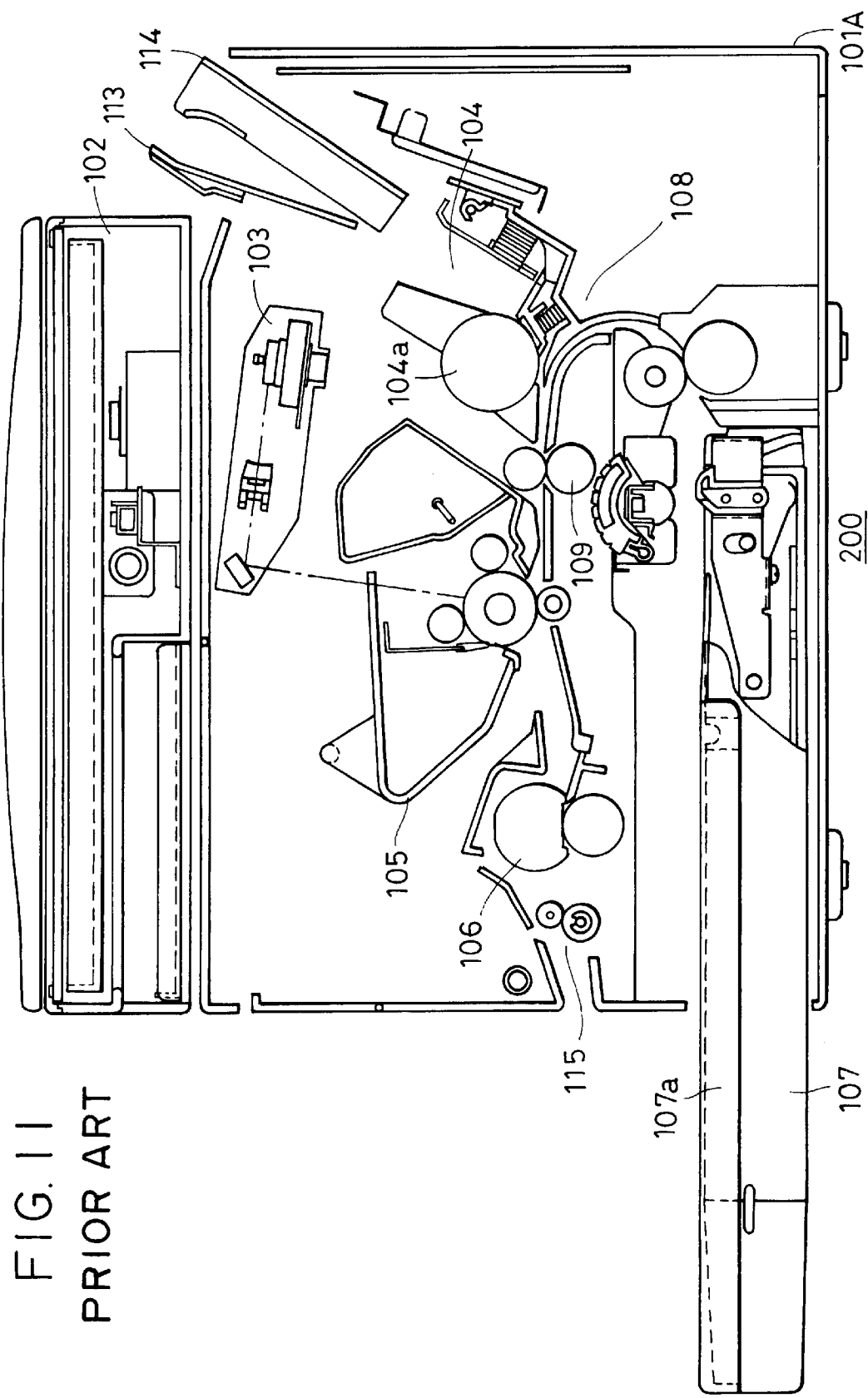
FIG. 11 is a side sectional view of a conventional image forming apparatus with an additional sheet cassette.

The reading section 2 of the image forming apparatus shown in FIG. 9 is rotatably supported by a rotation mechanism (not shown) at the back side of the apparatus (the turn guide 17 side).

Further, the reading section 2 is connected to the upper door 23 on the upper side of the apparatus casing 1 by a link mechanism (not shown), so that by rotating the reading section 2, the upper door 23 can be rotated in the same direction. That is, by extracting the sheet cassette 7 from the apparatus, and rotating the reading section 2 in a clamshell-like manner, the upper door 23 is wide open.

Due to this construction, it is possible to provide the user with a full space, so that it is possible to further achieve an improvement in operability in the replacement of the process cartridge 5 and jam processing.

Further, by rotating the reading section 2, it is possible to provide a space saving and easy-to-use image forming apparatus without substantially changing the area occupied by the apparatus.

In the image forming apparatus of the present invention described above, a manual feed guide section (manual sheet feed opening) for manually supplying the sheet to the multi-feed section is provided in the sheet feeding path arranged from the downstream side of the sheet loading cassette serving as the sheet supporting portion to the image forming means, whereby it is possible to increase the sheet feeding routes without involving an increase in the size of the apparatus. And, in the above-described image forming apparatus, the sheet loading cassette and the process cartridge 5 are detachable, and the space generated above the process cartridge 5 when the sheet loading cassette is detached is utilized, whereby the process cartridge 5 in the casing can be easily taken in and out.

While in the above embodiment and modifications the present invention is applied to a copying machine which reproduces an original image on a sheet on the basis of image information generated by image reading means, this should not be construed restrictively. The present invention is naturally also applicable, for example, to a facsimile apparatus which transmits original image information to an external terminal through a communication line and reproduces the image information received from the external terminal through the communication line on a sheet, and to a printer apparatus which reproduces image information input from an external apparatus on a sheet.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An image forming apparatus comprising:
   image reading means for reading an image on an original and for converting the image on the original to an electric signal to generate image information of the image on the original;
   image forming means for forming an image on the sheet according to the image information generated by said image reading means, and
   sheet feeding means for feeding sheets to said image forming means, said sheet feeding means comprising a sheet supporting portion for supporting sheets on which images are to be formed, wherein said sheet supporting portion is arranged between said image reading means and said image forming means.

2. An image forming apparatus according to claim 1, wherein said sheet feeding means includes a feeding roller for supplying one by one to said image forming means the sheets supported by the sheet supporting portion and a guide member for guiding the sheets fed by the feeding roller to the image forming means.

3. An image forming apparatus according to claim 2, wherein the sheet supporting portion is detachably connected to the image forming apparatus.

4. An image forming apparatus according to claim 3, wherein the sheet supporting portion includes a biasing means for upwardly biasing the sheets and a sheet opening portion for exposing the forward end portion of the uppermost one of the sheets biased by the biasing means, and wherein the feeding portion feeds the uppermost sheet.

5. An image forming apparatus according to claim 4, wherein the sheet supporting portion has on its upper side a sheet feeding guide portion for guiding sheets to the feeding portion.

6. An image forming apparatus according to claim 3, wherein the sheet supporting portion has a sheet opening portion for exposing the forward end portion of the lowermost sheet, and wherein the feeding portion feeds the lowermost sheet supported in the sheet supporting portion.

7. An image forming apparatus according to claim 3, wherein the image forming means is detachably provided in the main body of the image forming apparatus, and wherein the image forming apparatus has attaching/detaching means for attaching/detaching said image forming means so as to enable the image forming means to be detached by removing the sheet supporting portion.

8. An image forming apparatus according to claim 1, wherein the sheet supporting portion is detachably connected to the image forming apparatus.

9. An image forming apparatus according to claim 8, wherein the sheet supporting portion includes biasing means for upwardly biasing the sheets and a sheet opening portion for exposing the forward end portion of the uppermost one of the sheets biased by the biasing means, and wherein the feeding portion feeds the uppermost sheet.

10. An image forming apparatus according to claim 9, wherein the sheet supporting portion has on its upper side a sheet feeding guide portion for guiding sheets to the feeding portion.

11. An image forming apparatus according to claim 8, wherein the sheet supporting portion has a sheet opening portion for exposing the forward end portion of the lowermost sheet, and wherein the feeding portion feeds the lowermost sheet supported in the sheet supporting portion.

12. An image forming apparatus according to claim 8, wherein the image forming means is detachably provided in the main body of the image forming apparatus, and wherein the image forming apparatus has attaching/detaching means for attaching/detaching said image forming means so as to enable the image forming means to be detached by removing the sheet supporting portion.

13. An image forming apparatus according to claim 1, wherein said image reading means is rotatable with respect to the main body of the image forming apparatus so as to release the image forming means.

14. An image forming apparatus according to claim 13, wherein said sheet feeding means includes a feeding roller for supplying one by one to the image forming means the sheets supported by the sheet supporting portion and a guide member for guiding the sheets fed by the feeding roller to the image forming means.

15. An image forming apparatus according to claim 14, wherein the sheet supporting portion is detachably connected to the image forming apparatus.

16. An image forming apparatus according to claim 15, wherein the sheet supporting portion includes a biasing means for upwardly biasing the sheets and a sheet opening for exposing the forward end portion of the uppermost one of the sheets biased by the biasing means, and wherein the feeding portion feeds the uppermost sheet.

17. An image forming apparatus according to claim 16, wherein the sheet supporting portion has on its upper side a sheet feeding guide portion for guiding sheets to the feeding portion.

18. An image forming apparatus according to claim 15, wherein the sheet supporting portion has a sheet opening portion for exposing the forward end portion of the lowermost sheet, and wherein the feeding portion feeds the lowermost sheet supported in the sheet supporting portion.

19. An image forming apparatus according to claim 15, wherein the image forming means is detachably provided in the main body of the image forming apparatus, and further comprising means for detaching the image forming apparatus from the main body of the image forming apparatus by removing the sheet supporting portion and rotating the image reading means.

20. An image forming apparatus according to claim 1, wherein the sheet supporting portion is a sheet loading cassette.

21. An image forming apparatus according to claim 1, further comprising a manual sheet feed opening portion for feeding sheets one by one by manual feed to the image forming means.

22. An image forming apparatus according to claim 1, further comprising a sheet inclining support section for supporting sheets in an inclined position and feeding them to the image forming means.

23. An image forming apparatus according to claim 1, wherein the image reading means has an optical system for converting reflected light from an image into an electric signal, and wherein the image forming means forms an image on a sheet on the basis of the image information from said image reading means.

24. An image reading apparatus according to claim 23, wherein said image reading means has a flat bed type original tray.

25. An image forming apparatus according to claim 1, wherein said sheet supporting portion is arranged above said image forming means and said image reading means is arranged above said sheet supporting portion.

26. An image forming apparatus comprising:

image reading means for reading an image on an original, said image reading means rotatably mounted for movement between a closed position where an image is read and an open position, a main body positioned below said image reading means, said main body having an upper door and a front door each openable by pivoting movement, image forming means positioned in said main body for forming an image from the information read by said image reading means, said image forming means detachably provided in said main body and sheet feeding means for feeding sheets to said image forming means, said sheet feeding means comprising a sheet supporting portion for supporting sheets on which images are to be formed and a feeding portion for feeding the sheets accommodated in the sheet supporting portion to the image forming means, and arranged between said image reading means and said image forming means, wherein rotation of said image reading means to the open position allows the front door and the upper door each to be rotated to the open position to provide for an opening to remove said image forming means.

* * * * *

UNITED STATES PATENT AND TRADEMARK OFFICE
CERTIFICATE OF CORRECTION

PATENT NO.   : 6,473,576 B1
DATED        : October 29, 2002
INVENTOR(S)  : Yoshiyuki Koshimizu et al.

It is certified that error appears in the above-identified patent and that said Letters Patent is hereby corrected as shown below:

Column 1,
Line 67, "to" should read -- to be --.

Column 8,
Line 44, "side" should read -- side of --.

Signed and Sealed this

Twenty-fifth Day of March, 2003

JAMES E. ROGAN
*Director of the United States Patent and Trademark Office*